United States Patent
Izumi et al.

(10) Patent No.: US 9,718,328 B2
(45) Date of Patent: Aug. 1, 2017

(54) ENGINE CONTROL APPARATUS

(71) Applicant: DENSO CORPORATION, Kariya, Aichi-pref. (JP)

(72) Inventors: Kazunari Izumi, Kariya (JP); Kazutoshi Kuwayama, Kariya (JP); Takuya Gotou, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 14/921,469

(22) Filed: Oct. 23, 2015

(65) Prior Publication Data
US 2016/0114652 A1 Apr. 28, 2016

(30) Foreign Application Priority Data

Oct. 28, 2014 (JP) .................. 2014-219636
Jan. 29, 2015 (JP) .................. 2015-015116

(51) Int. Cl.
*B60H 1/32* (2006.01)
*B60W 20/10* (2016.01)

(52) U.S. Cl.
CPC .......... *B60H 1/3208* (2013.01); *B60W 20/10* (2013.01); *B60H 2001/3273* (2013.01); *B60W 2510/30* (2013.01); *B60W 2710/0677* (2013.01); *B60W 2710/305* (2013.01); *Y10S 903/93* (2013.01)

(58) Field of Classification Search
CPC ......... B60H 1/3208; B60H 2001/3273; B60W 20/10; B60W 2510/30; B60W 2710/0677; B60W 2710/305; Y10S 903/93
See application file for complete search history.

(56) References Cited

U.S. PATENT DOCUMENTS

| | | | | |
|---|---|---|---|---|
| 5,473,228 A | * | 12/1995 | Nii | B60H 1/004 290/17 |
| 2003/0159455 A1 | | 8/2003 | Aikawa et al. | |
| 2009/0293521 A1 | * | 12/2009 | Major | B60H 1/005 62/228.1 |
| 2011/0067419 A1 | | 3/2011 | Aoyagi | |

FOREIGN PATENT DOCUMENTS

| | | |
|---|---|---|
| JP | 2000-232799 A | 8/2000 |
| JP | 2003-285634 A | 10/2003 |
| JP | 2011-068190 A | 4/2011 |
| JP | 2011-189817 A | 9/2011 |

* cited by examiner

*Primary Examiner* — Aaron L Troost
(74) *Attorney, Agent, or Firm* — Oliff PLC

(57) ABSTRACT

A control apparatus is applied to a system including an engine and a compressor for air-conditioning, and adjusts an operating point of the engine when the engine is operated. The control apparatus determines whether or not to allow increase in engine output to drive a compressor based on an air-conditioning request, based on the operating point of the engine before driving of the compressor in relation to a predetermined high-efficiency region including a maximum efficiency point in an efficiency characteristics of the engine, when the compressor is driven in response to the air-conditioning request. The control apparatus controls the engine output such that the operating point of the engine is in the high-efficiency region, if the increase in engine output is determined to be allowed.

20 Claims, 9 Drawing Sheets

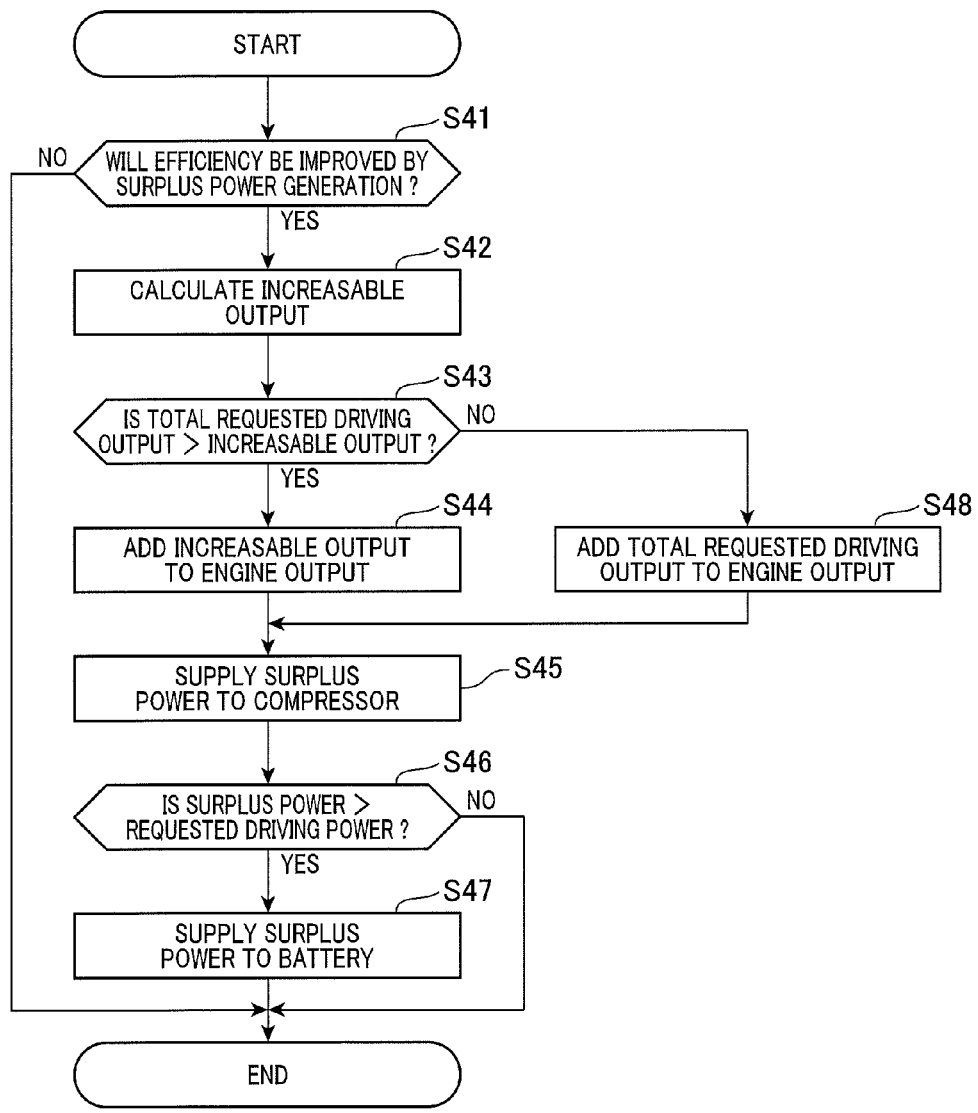

ENGINE CONTROL APPARATUS

CROSS-REFERENCE TO RELATED APPLICATION

This application is based on and claims the benefit of priority from Japanese Patent Application Nos. 2014-219636, filed Oct. 28, 2014, and 2015-015116, filed Jan. 29, 2015. The entire disclosures of each of the above applications are incorporated herein by reference.

BACKGROUND

Technical Field

The present disclosure relates to a control apparatus that includes a compressor for air-conditioning, and is used in a system that enables adjustment of an operating point when an engine is operated.

Related Art

For example, a hybrid vehicle includes an engine and an electric motor as power sources for running the vehicle. The hybrid vehicle runs using power from at least one of the engine and the electric motor. In the hybrid vehicle, there is an engine stop period while the vehicle is running. Therefore, an electric compressor is used as the compressor for air-conditioning. In this case, an on-board battery is charged by a power generator, as appropriate, by regenerative drive and engine drive. In addition, when an air-conditioning request for air-conditioning to be performed is issued, the battery supplies power to the compressor based on the air-conditioning request. Thus, the compressor is driven by power supply from the battery (refer to JP-A-2000-232799).

In a configuration, such as that described above, in which the compressor is driven by power supply from the battery, deterioration of power consumption performance becomes a concern. This is because battery power, which involves large charge/discharge loss, is used. Power consumption is defined as, for example, the amount of increase in fuel consumption per unit power generated. In addition, while the compressor is driven, feedback control is generally performed so as to make the actual temperature inside a vehicle cabin match a target temperature. However, in this configuration, energy efficiency related to compressor-driving is not taken into consideration. Therefore, it is thought that there is room for technical improvement.

SUMMARY

It is thus desired to provide a control apparatus that is capable of improving power consumption performance.

An exemplary embodiment of the present disclosure provides a control apparatus that is applied to a system including an engine and a compressor for air-conditioning, and adjusts an operating point of the engine when the engine is operated. The control apparatus includes an allowed/not-allowed (allowed/prohibited) determiner means and a controller means. The allowed/not-allowed determiner means determines whether or not to allow increase in engine output to drive a compressor based on an air-conditioning request, based on the operating point of the engine before driving of the compressor in relation to a predetermined high-efficiency region including the maximum efficiency point, when the compressor is driven in response to the air-conditioning request. The controller means controls the engine output such that the operating point of the engine is in the high-efficiency region, when a determination is made to allow the increase in engine output.

In the present disclosure, when the compressor is driven based on an air-conditioning request, whether or not to allow increase in engine output to drive the compressor is determined based on the operating point of the engine in relation to the predetermined high-efficiency region including the maximum efficiency point before driving of the compressor. When a determination is made to allow the increase in engine output, the engine output is controlled such that the operating point of the engine is in the high-efficiency region. Therefore, reduction in engine efficiency attributed to driving of the compressor can be suppressed. In addition, from the perspective of the engine side, the operating point of the engine can be brought into the high-efficiency region from outside the high-efficiency region, based on driving of the compressor. As a result, improvement in power consumption performance can be actualized.

BRIEF DESCRIPTION OF THE DRAWINGS

In the accompanying drawings:

FIG. 8 is a flowchart of a pre-driving process according to the second embodiment;

DESCRIPTION OF EMBODIMENTS

First Embodiment

Embodiments of the present invention will be described with reference to the drawings. In the descriptions below, the control apparatus of the present invention is applied to a hybrid vehicle that obtains driving force for running the vehicle from an engine and an electric motor for running. The hybrid vehicle is capable of switching between a running state (HV operation mode) in which the hybrid vehicle runs by obtaining driving force from both the engine and the electric motor for running, a running state (EV operation mode) in which the engine is stopped and the hybrid vehicle runs by obtaining driving force from only the electric motor for running, and a running state in which the hybrid vehicle runs by obtaining driving force from only the engine.

Figure 1:
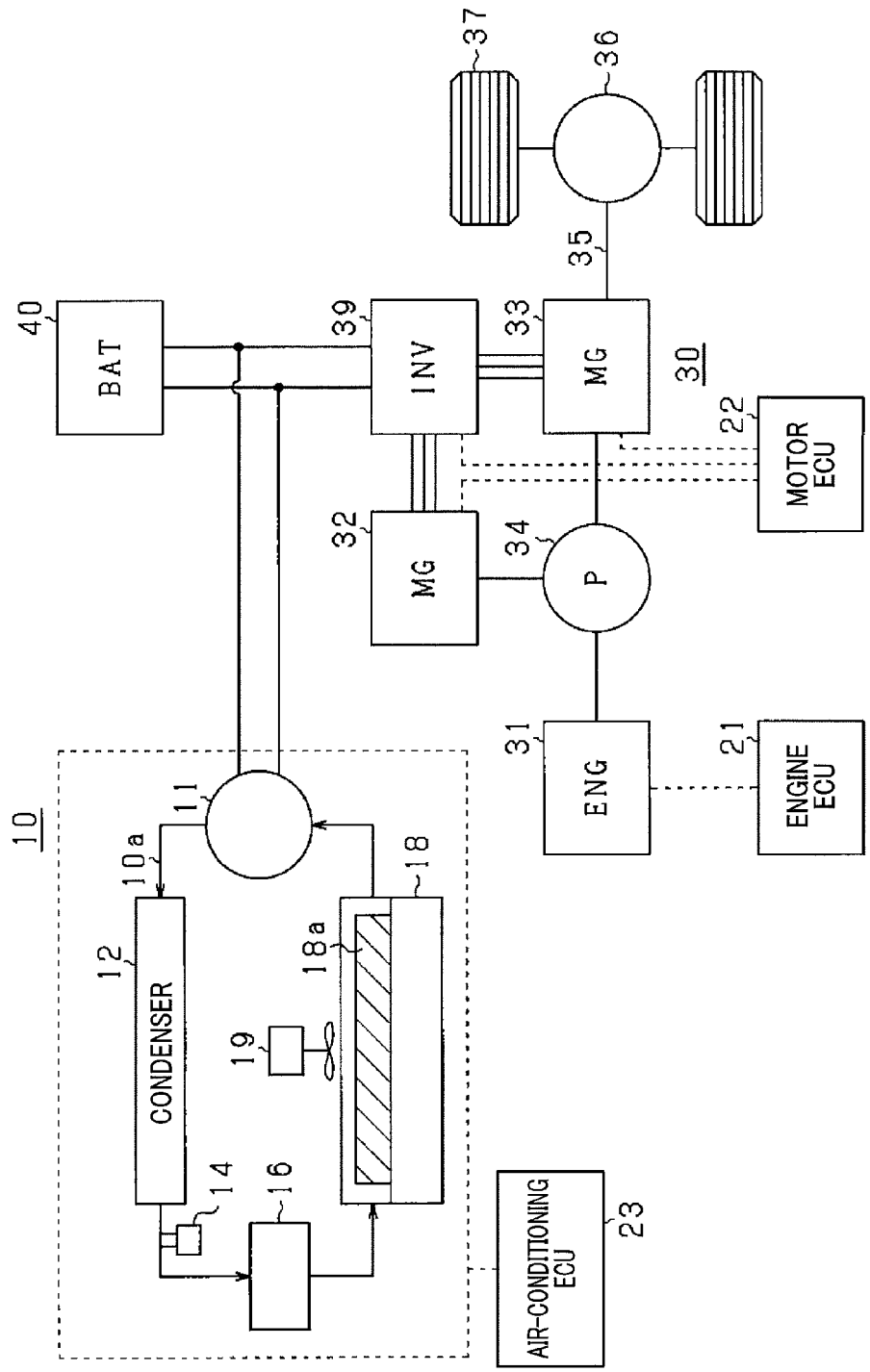
FIG. 1 is a schematic diagram of an air-conditioning system and an engine system according to a first embodiment.

In FIG. 1, a vehicle 30 includes an engine 31, motors 32 and 33, a planetary gear unit 34, a drive shaft 35, a differential gear 36, a drive wheel 37, an inverter 39, and a battery 40. The motors 32 and 33 are configured by electrical power generators. Specifically, the engine 31 is a known internal combustion engine that uses gasoline, light oil, or the like as fuel. The engine 31 generates a desired engine output by combusting an air-fuel mixture inside a combustion chamber. The air-fuel mixture is composed of fuel and air, and is injected from a fuel injection valve. The engine 31 and the motors 32 and 33 are drivably connected to each other by the planetary gear unit 34. For example, an output shaft of the engine 31 is connected to a carrier in the planetary gear unit 34. The motor 32 is connected to a sun gear. The drive shaft 35 is connected to a link gear. In addition, the motor 33 is connected to the drive shaft 35.

The inverter 39 is connected to the motors 32 and 33. When the motors 32 and 33 are driven, power is supplied to each of the motors 32 and 33 from the battery 40, via the inverter 39. In addition, the motors 32 and 33 function as a power generator means. When power is generated by the motors 32 and 33, the generated power is supplied to the battery 40 via the inverter 39. The battery 40 is charged by the supplied power. Specifically, during deceleration of the vehicle 30, the motor 33 performs regenerative power generation. When a charge request is issued at times other than during regenerative power generation, the motor 32 performs power generation by the engine 31 being driven.

In addition, the vehicle 30 includes an engine electronic control unit (ECU) 21 that controls the engine 31, and a motor ECU 22 that controls the motors 32 and 33 and the inverter 39. The ECUs 21 and 22 are each mainly configured by a known microcomputer that is composed of a central processing unit (CPU), a read-only memory (ROM), a random access memory (RAM), and the like. The basic configuration of control performed by the ECUs 21 and 22 is well known. Therefore, a detailed description thereof is omitted. However, a brief description is as follows.

The engine ECU 21 obtains engine rotation speed, engine load, water temperature, air-fuel ratio, and the like as information indicating an engine operating state. The engine ECU 21 controls the fuel injection amount, ignition timing, air amount, and the like, as appropriate, based on the obtained information. In addition, the motor ECU 22 controls driving of the motors 32 and 33 in response to a motor drive request, and also controls charging/discharging of the battery 40. Regarding charging of the battery 40, the motor ECU 22 calculates a state of charge (SOC) of the battery 40 based on terminal voltage, charge/discharge current, and the like of the battery 40, and charges the battery 40, as appropriate, based on the SOC.

In addition, FIG. 1 shows an on-board air-conditioning system. An air-conditioning system 10 is configured to include a compressor 11, a condenser 12, a receiver 14, a thermal expansion valve 16, an evaporator 18, a fan 19, and the like. The compressor 11 intakes and discharges a refrigerant to circulate the refrigerant in a refrigeration cycle 10a. The compressor 11 is an electric compressor that is driven by power supply received from the battery 40 or the like. In addition, the compressor 11 is provided with a variable capacity function. The refrigerant discharge capacity of the compressor 11 can be continuously variably set by an energization operation of an electromagnetically driven control valve.

The evaporator 18 vaporizes some or all of the refrigerant by heat exchange between the air blown from the fan 19 and the refrigerant, which is in a mist state. The fan 19 is rotatably driven by a direct current (DC) motor or the like. As a result, the air blown from the fan 19 is cooled, and the cooled air is sent to the vehicle cabin, via an air outlet (not shown) provided inside the vehicle cabin. The vehicle cabin interior is thereby cooled.

According to the present embodiment, the evaporator 18 is provided with a cold storage function. That is, a cold storage material 18a, such as paraffin, is enclosed within the evaporator 18. The cold storage material 18a stores surplus heat for cooling that is generated in the refrigeration cycle 10a when the compressor 11 is driven. The heat stored in the cold storage material 18a can be used for cooling while the compressor 11 is stopped.

Specifically, heat of the refrigerant is stored in the evaporator 18 by heat exchange between the refrigerant that is supplied to the evaporator 18 by the compressor 11 being driven, and the cold storage material 18a. Subsequently, when the compressor 11 is stopped, heat is exchanged between the air blown from the fan 19 and the cold storage material 18a, and the blown air is thereby cooled. The cooled air is then sent to the vehicle cabin. As a result, the vehicle cabin interior is cooled even when the compressor 11 is stopped. The refrigerant that flows out of the evaporator 18 is taken in through an intake opening of the compressor 11.

An air-conditioning ECU 23 that controls the air-conditioning system 10 is mainly configured by a known microcomputer that is composed of a CPU, a ROM, a RAM, and the like. Various command signals are inputted into the air-conditioning ECU 23. These command signals serve as commands to drive the compressor 11 so as to cool the vehicle cabin interior. For example, signals are inputted from an A/C switch (not shown), a temperature sensor (evaporator sensor) that detects the temperature of the air that has been heat-exchanged in the evaporator 18, and an external temperature sensor that detects the outside temperature equivalent to the temperature of the air before being heat-exchanged in the evaporator 18.

The air-conditioning ECU 23 performs cooling control of the vehicle cabin interior (controls driving of the compressor 11) and the like by running various control programs stored in the ROM, in response to input of the foregoing signals. That is, in a state in which the A/C switch is turned ON, when the temperature inside the vehicle cabin exceeds a target value thereof by a predetermined amount or more, the air-conditioning ECU 23 determines that an air-conditioning request to perform cooling is issued. The air-conditioning ECU 23 outputs a request signal, as needed, to drive the compressor 11 so as to circulate the refrigerant in the refrigeration cycle 10a.

The ECUs 21 to 23 are electrically connected and capable of bi-directional communication. Therefore, based on detection signals or operating signals inputted into either of the ECUs 21 and 23, driving of various apparatuses connected to the output side of the other ECU can be controlled. For example, the engine ECU 21 is capable of receiving a request signal outputted from the air-conditioning ECU 23.

According to the present embodiment, when the compressor 11 is driven based on an air-conditioning request, in addition to the compressor 11 being driven by power supplied from the battery 40, the compressor 11 can also be driven by receiving power generated by the motor 32. In other words, when the compressor 11 is driven in response to the air-conditioning request, the motor 23 performs surplus power generation by the engine 31 being driven. The power resulting from the surplus power generation (referred to, hereafter, as surplus power) is then used to drive the compressor 11. That is, in surplus power generation, surplus power that is not used as the driving force for running the vehicle 30 is outputted. In this case, the amount of output of the surplus power is added to the engine output at the start of driving of the compressor 11, and operation of the engine 31 thereby is controlled.

In addition, according to the present embodiment, the engine ECU 21 is capable of adjusting the operating point during operation of the engine 31. When the compressor 11 is driven based on an air-conditioning request, the engine ECU 21 determines whether or not to allow increase in engine output (the surplus power generation by the motor 32 by the engine 31 being driven) to drive the compressor 11 in response to the air-conditioning request, based on where the engine operating point is before driving of the compressor 11, in relation to a predetermined high-efficiency region that includes the maximum efficiency point of engine efficiency characteristics. In other words, the engine ECU 21 determines whether or not to allow increase in engine output to drive the compressor 11 in response to the air-conditioning request, based on the operating point of the engine before driving of the compressor 11 in relation to the predetermined high-efficiency region including a maximum efficiency point. In addition, when determined that the increase in engine output is allowed, the engine ECU 21 controls engine output such that the operating point of the engine is in the high-efficiency region.

Figure 2:
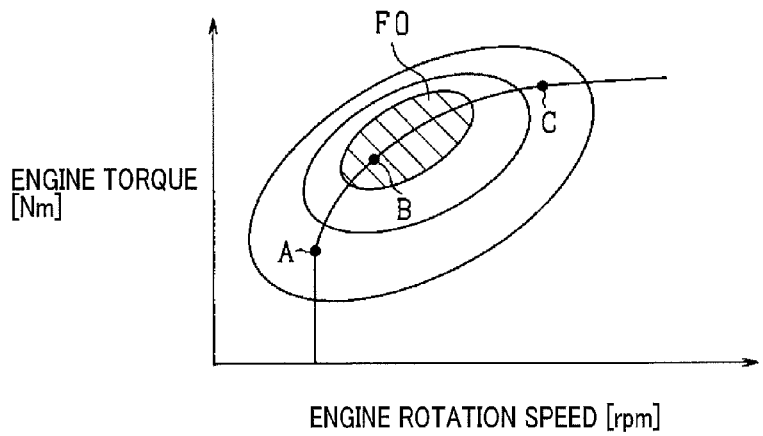
FIG. 2 is a map of engine efficiency characteristics.

Here, FIG. 2 shows a map of engine efficiency characteristics. In FIG. 2, a performance curve (torque curve) of the engine 31 is prescribed with the engine rotation speed (NE) and engine torque as parameters. The magnitude of engine efficiency in each region is also prescribed. A region in which engine efficiency is the same is indicated by a contour line. Engine efficiency characteristics are also characteristics indicating an equivalent fuel consumption curve. In the map, a high-efficiency region F0 is shown as a region including the maximum efficiency point. A relationship is prescribed in which engine efficiency decreases as the operating point becomes farther from the high-efficiency region F0.

For example, when the engine operating point is point A that is further towards the low NE (engine rotation speed) side than the high-efficiency region F0, as a result of the increase in engine output (the surplus power generation by the motor 32 by the engine 31 being driven) being performed, the engine operating point nears the high-efficiency region F0. The engine 31 can be operated within the high-efficiency region F0. In this case, the desired driving power can be supplied to the compressor 11 while operating the engine 31 at high efficiency (low fuel consumption). According to the present embodiment, in particular, because the cold storage-type evaporator 18 is used in the air-conditioning system 10, the increase in engine output to drive the compressor 11 can be relatively large. The engine operating point can be more easily set in the high-efficiency region F0.

When the engine operating point is point B within the high-efficiency region F0, or point C that is further towards the high NE side than the high-efficiency region F0, reduced engine efficiency resulting from the increase in engine output becomes a concern. Therefore, engine output is not increased.

In addition, in a state in which the compressor 11 is being driven as a result of the increase in engine output (the surplus power generation by the motor 32 by the engine 31 being driven), the engine operating point is in the high-efficiency region F0 at the initial start of driving of the compressor 11. However, there is concern that the engine operating point may shift further towards the high NE side than the high-efficiency region F0, due to various fluctuating factors such as fluctuations in the vehicle running state and the engine operating state. Therefore, according to the present embodiment, in a state in which the compressor 11 is being driven, whether or not the engine operating point has shifted further towards the high NE side than the high-efficiency region F0 is determined. Engine output is decreased when the shift occurs.

Next, a process performed by the air-conditioning ECU 23 and a process performed by the engine ECU 21 will be described with reference to FIG. 3 and FIG. 4. The following processes are repeatedly performed by the air-conditioning ECU 23 and the engine ECU 21 when an ignition switch (not shown) is turned ON.

First, the process performed by the air-conditioning ECU 23 will be described with reference to FIG. 3. First, the air-conditioning ECU 23 determines whether or not an air-conditioning request to perform cooling has been issued (step S11). When determined that an air-conditioning request is issued, the air-conditioning ECU 23 determines whether or not the compressor 11 is in a stop state (step S12).

When determined that the compressor 11 is in the stop state (that the compressor 11 has stopped), the air-conditioning ECU 23 determines whether or not output conditions for a request signal are met (step S13). At this time, the air-conditioning ECU 23 determines that the output conditions for the request signal are met when the temperature inside the vehicle cabin is higher than the target value by a predetermined amount, and the remaining cooling capability due to cold storage in the evaporator 18 is zero or near zero. The remaining cooling capability of the evaporator 18 is preferably determined based on, for example, the evaporator temperature detected by the evaporator sensor. When the evaporator temperature is a predetermined temperature or higher, the air-conditioning ECU 23 determines that the compressor 11 needs to be driven and determines that the output conditions for the request signal are met. When the evaporator temperature is lower than the predetermined temperature, the air-conditioning ECU 23 determines that the compressor 11 does not need to be driven and determines that the output conditions for the request signal are not met. Alternatively, the remaining cooling capability of the evaporator 18 may be determined based on the amount of time elapsed from when driving of the compressor 11 (refrigerant circulation) is stopped.

When determined YES at step S13, the air-conditioning ECU 23 outputs a request signal (step S14). The request signal includes information, such as a requested driving output PD required to drive the compressor 11. According to the present embodiment, the amount of power that enables driving at the highest efficiency is prescribed as the requested driving output PD, taking into consideration the efficiency of the compressor 11 (for example, PD=4.0 kW).

When determined that the compressor 11 is in a driving state at step S12, the air-conditioning ECU 23 determines whether or not a stop condition for the compressor 11 is met (step S15). For example, the air-conditioning ECU 23 may determine that the stop condition is met upon the elapse of a predetermined amount of time from the start of driving of the compressor 11. The predetermined amount of time is preferably determined based on the cold storage capability of the evaporator 18. For example, the predetermined amount of time is increased as the cold storage capability increases. When determined that the stop condition for the compressor 11 is met, the air-conditioning ECU 23 stops output of the request signal (step S16). The air-conditioning ECU 23 ends the process when determined that the stop condition of the compressor 11 is not met at step S15.

Next, the process performed by the engine ECU 21 will be described with reference to FIG. 4. In FIG. 4, first, the engine ECU 21 determines whether or not a request signal has been received from the air-conditioning ECU 23 (step S21). When determined that a request signal is not received, the engine ECU 21 ends the process. When determined that a request signal is received, the engine ECU 21 determines whether or not the current state is before the start of driving of the compressor 11 in response to the request signal (step S22). When determined that a request signal is received and the compressor 11 is not yet driven, the engine ECU 21 performs a pre-driving process (steps S23 to S27). When determined that a request signal is received and the compressor 11 is being driven, the engine ECU 21 performs a post driving-start process (steps S28 to S33).

As the pre-driving process, first, the engine ECU 21 determines whether or not engine efficiency will improve as a result of surplus power generation being performed by the motor 32 by the engine 13 being driven (step S23). Specifically, the engine ECU 21 determines whether or not the current engine operating point is further towards the low NE side than the high-efficiency region F0. When determined that the current engine operating point is on the low NE side, the engine ECU 21 determines that engine efficiency will improve. In other words, the engine ECU 21 determines YES at step S23 when determined that the engine operating point will become closer to the high-efficiency region F0 as a result of surplus power generation by the motor 32. The engine ECU 21 thereby allows increase in engine output. When determined NO at step S23, the engine ECU 21 ends the process. When determined NO at step S23, the compressor 11 cannot be driven using surplus power. Therefore, the compressor 11 can be driven by power supply from the battery 40.

When determined YES at step S23, the engine ECU 21 calculates an increasable output by which engine output can be increased without the engine operating point exceeding the high-efficiency region F0, based on the current engine operating point (step S24). The increasable output is calculated as a smaller power value as the current engine operating point becomes closer to the high-efficiency region F0, and is calculated as a larger value as the current engine operating point becomes farther from the high-efficiency region F0.

Subsequently, the engine ECU 21 determines whether or not the requested driving output PD for the compressor 11 is greater than the increasable output (step S25). When determined that the requested driving output PD for the compressor 11 is greater than the increasable output, the engine ECU 21 adds the amount of increase corresponding to the increasable output to the current engine output (step S26). When determined that the requested driving output PD for the compressor 11 is less than the increasable output, the engine ECU 21 adds the amount of increase corresponding to the requested driving output. PD for the compressor 11 to the current engine output (step S27).

In other words, at steps S25 to S27, the smaller of the requested driving output PD for the compressor 11 and the increasable output is added to the current engine output. As a result, surplus power generation by the motor 32 can be performed while preventing the post-addition engine output from leaving the high-efficiency region F0.

At step S26, because the increasable output that is less than the requested driving output PD is added to the engine output, the engine output is insufficient for the requested driving output PD. However, the insufficient amount may be supplemented by power supply from the battery 40.

When the addition to the engine output is performed as described above, the engine ECU 21 increases intake air amount and fuel injection amount in an output control process (not shown). As a result, the engine output is controlled such that the operating point of the engine 31 is in the high-efficiency region F0. The operating point of the engine 31 is not necessarily required to be in the high-efficiency region F0. All that is required is that the engine operating point be shifted closer to the high-efficiency region F0.

In addition, as the post driving-start process, first, the engine ECU 21 determines whether or not the engine operating point will become closer to the high-efficiency region F0 when the amount of increase in engine output to drive the compressor 11 is decreased (step S28). That is, it is premised that the engine operating point may shift further towards the high NE side than the high-efficiency region F0 as a result of various fluctuating factors. The engine ECU 21 determines whether or not efficiency improvement is needed as a result of the shift from the high-efficiency region F0. When determined NO at step S28, the engine ECU 21 ends the process.

When determined YES at step S28, the engine ECU 21 determines whether or not the current air-conditioning request can be fulfilled, or in other words, whether or not air-conditioning of the vehicle cabin interior can be continued, even when the amount of increase in engine output is decreased (step S29). When determined NO at step S29, the engine ECU 21 ends the process.

When determined YES at step S29, the engine ECU 21 calculates a decreasable output by which engine output can be decreased without the engine operating point exceeding the high-efficiency region F0, based on the current engine operating point (the operating point when the compressor 11 is in the driving state) (step S30). The decreasable output is calculated as a larger power value as the current engine operating point shifts more towards the high NE side from the high-efficiency region F0.

Subsequently, the engine ECU 21 determines whether or not the requested driving output PD for the compressor 11 is greater than the decreasable output (step S31). When determined that the requested driving output PD for the compressor 11 is greater than the decreasable output, the engine ECU 21 subtracts the decreasable output from the current engine output (step S32). When determined that the requested driving output PD of the compressor 11 is less than the decreasable output, the engine ECU 21 subtracts the requested driving output PD of the compressor 11 from the current engine output (step S33).

In other words, at steps S31 to S33, the smaller of the requested driving output PD for the compressor 11 and the decreasable output is subtracted from the current engine output. As a result, surplus power generation by the motor 32 can be performed while preventing the post-subtraction engine output from leaving the high-efficiency region F0.

When the amount of the surplus power added at the start of driving of the compressor 11 is reduced as a result of the processes at steps S32 and S33, the engine output is insufficient for the requested driving output PD. However, the insufficient amount may be supplemented by power supply from the battery 40.

Next, an execution example of the processes described above will be described with reference to FIG. 5. In the present example, it is premised that the engine operating point is further towards the low NE side than the high-efficiency region F0 (such as point A in FIG. 2) when the compressor 11 is driven based on an air-conditioning request.

Figure 5:
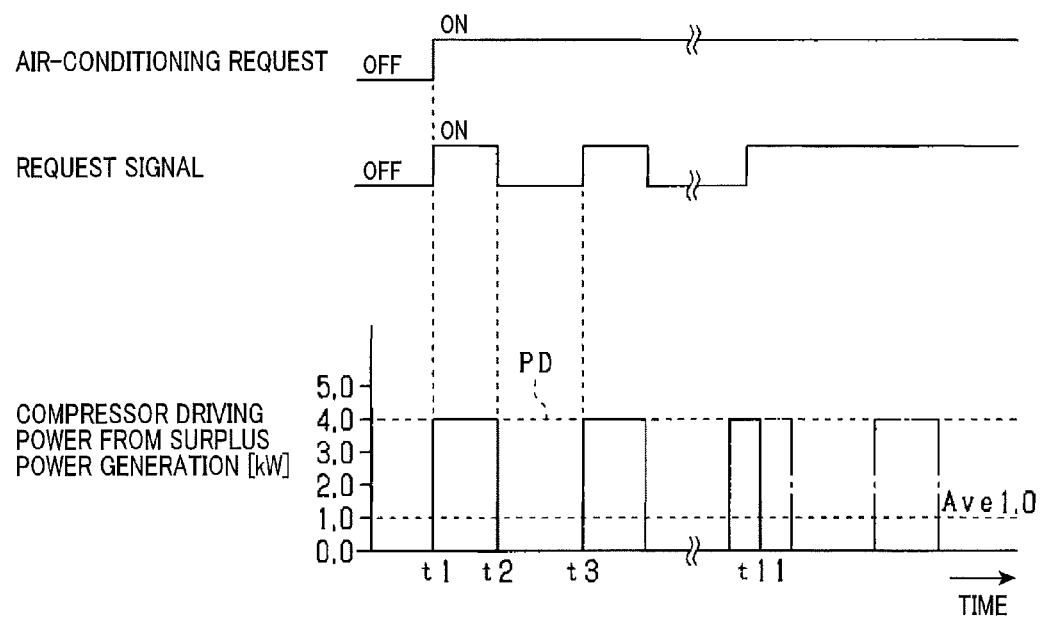
FIG. 5 is a diagram of an execution example of the processes performed by the air-conditioning ECU and the engine ECU.

In FIG. 5, an air-conditioning request is issued at time t1. The compressor 11 is driven thereafter, as needed. First, at time t1, the request signal to drive the compressor 11 is outputted from the air-conditioning ECU 23 to the engine ECU 21. At this time, because the engine operating point is further towards the low NE side than the high-efficiency region F0, as described above, the engine ECU 21 determines that engine efficiency will be improved by surplus power generation. The engine ECU 21 allows increase in engine output. In FIG. 5, a case in which a requested driving output PD is equal to or less than an increasable output (PD≤increasable output) is premised. Therefore, power equal to the requested driving output PD is supplied to the compressor 11 from the motor 32. The compressor 11 is driven by the supplied power.

When surplus power generation by the motor 32 is performed, engine output is increased such that the engine operating point is in the high-efficiency region F0. At this time, if the requested driving output PD is more than increasable output (PD>increasable output), the amount of increase in engine output is limited by the increasable output.

In this case, the compressor 11 is driven by driving power that is greater than the driving power (feedback amount) calculated based on the deviation between the vehicle cabin temperature and the target temperature. For example, whereas driving power of about 1 kW is required based on the feedback amount, a larger driving power of about 4 kW is supplied.

Power supply to the compressor 11 is performed during the period of time t1 to t2 during which the request signal is generated. The period of time t1 to t2 is a cold storage period during which cold storage is performed in the evaporator 18. The surplus amount of heat generated by the driving of the compressor 11 is cold-stored in the cold storage material 18a.

Subsequently, at time t2, output of the request signal is stopped, and driving of the compressor 11 is stopped in accompaniment. At time t2, surplus power generation by the motor 32 (addition to engine output) is stopped. Then, during the cold release period following time t2, air conditioning is continued using the cold storage of the cold storage material 18a while the compressor 11 is in a stop state.

Then, at time t3, when the remaining cooling capability by cold storage in the evaporator 18 has decreased to zero or near zero, the request signal is again outputted from the air conditioning ECU 23. As a result, in a manner similar to that at time t1, increase in engine output is allowed and driving of the compressor 11 by surplus power generation is started. Thereafter, driving of the compressor 11 by surplus power generation by the motor 32 is intermittently performed in a state in which the air conditioning request is being issued.

Here, when engine output increases as a result of fluctuations in the vehicle running state and the like, and the engine operating point shifts, during driving of the compressor 11 by surplus power generation, the process to reduce the amount of increase in engine output (the amount of surplus power generation) is performed. That is, at time t11 in FIG. 5, the requested driving output PD is subtracted from the current engine output. In this case, driving of the compressor 11 by surplus power generation cannot be continued. However, the state in which the engine operating point is in the high-efficiency region F0 is maintained.

Following time t11, the engine operating point is in the high-efficiency region F0 in a state in which surplus power generation is not performed. No further efficiency improvement can be expected. Therefore, driving of the compressor 11 by the surplus power generation by the motor 32 is not performed.

As a result of the foregoing, the following excellent effects are achieved.

When the compressor for air conditioning is directly driven by the generated power of a motor, improvement in power consumption performance can be expected, compared to when the compressor is driven by power supplied from a battery. A reason for this is that charge/discharge loss increases in a battery during power use. However, when power generation by a motor (that is, power supply to the compressor) is performed by the engine being driven without taking into consideration engine efficiency, there is concern that not much improvement in power consumption performance can be expected.

In this regard, in the above-described configuration, when the compressor 11 is driven based on an air-conditioning request, whether or not to allow increase in engine output to drive the compressor 11 is determined based on the operating point of the engine 31 in relation to the high-efficiency region F0 including the high efficiency point before the compressor 11 is driven. When a determination is made to allow increase in engine output, the engine output is controlled such that the operating point of the engine 31 is in the high-efficiency region F0.

Therefore, reduction in engine efficiency attributed to driving of the compressor 11 can be suppressed. In addition, from the perspective of the engine 31 side, the operating point of the engine 31 can be brought into the high-efficiency region F0 from outside the high-efficiency region F0, based on driving of the compressor 11. Therefore, as a result, improvement in power consumption performance can be actualized.

When the compressor 11 is driven in response to an air conditioning request, a determination to allow increase in engine output is made when the engine operating point becomes closer to the high-efficiency region F0 as a result of surplus power generation by the motor 32. In this case, determination of the suitability of surplus power generation by the motor 32 can be favorably performed, and can contribute to improving power consumption performance.

As a result of the above-described configuration, when the requested driving output for the compressor 11 is greater than the increasable output, the amount of increase corresponding to the increasable output, rather than the amount of increase corresponding to the requested driving output for the compressor 11, is added to the current engine output. Therefore, the engine operating point after the increase in engine output exceeding the high-efficiency region F0 can be suppressed.

As a result of the above-described configuration, when the requested driving output for the compressor 11 is less than the increasable output, the amount of increase corresponding to the requested driving output for the compressor 11 is added to the current engine output. Therefore, increase in engine output appropriate for the request signal to drive the compressor 11 can be suitably performed. As a result, control of engine output appropriate for the request signal can be suitably performed, while maintaining the engine operating point after increase in engine output within the high-efficiency region.

When surplus power generation by the motor 32 is performed, the requested driving output for the compressor 11 is power enabling the compressor 11 to be driven in a predetermined high efficiency state. In this case, driving of the compressor 11 can be performed taking into consideration efficiency on the compressor 11 side, as well.

Increase in engine output is performed intermittently with pauses between increases, rather than the engine output being continuously increased. Therefore, optimization of engine efficiency can be achieved while suppressing excessive supply of power to the compressor 11.

When the cold storage material 18a is provided that stores heat from the refrigerant that is circulated by the compressor 11 being driven, the cold release period of the cold storage material 18a can be increased when driving of the compressor 11 is intermittently performed by surplus power generation by the motor 32, when the compressor 11 is driven based on an air-conditioning request. In this case, a more suitable engine control can be actualized without excessively introducing surplus power for air-conditioning.

In a state in which the compressor 11 is being driven by surplus power from the motor 32, a determination is made regarding whether or not the engine operating point will be closer to the high-efficiency region F0 as a result of the amount of increase in engine output for driving the compressor 11 being reduced. When the engine operating point is determined to become closer to the high-efficiency region F0, the engine output is decreased. In this case, even when the engine operating point shifts to a state in which the engine output is controlled by surplus power from the motor 32, the engine operating point can be maintained within the high frequency region F0.

As a result of the above-described configuration, when the requested driving output for the compressor 11 is greater than a decreasable output, the amount of decrease corresponding to the decreasable output is subtracted from the current engine output, rather than the amount of decrease corresponding to the requested driving output for the compressor 11. Therefore, the engine operating point after decrease in engine output exceeding the high-efficiency region can be suppressed.

As a result of the above-described configuration, when the requested driving output for the compressor 11 is less than the decreasable output, the amount of decrease corresponding to the requested drive output of the compressor 11 is subtracted from the current engine output. Therefore, decrease in engine output appropriate for the request signal can be suitably performed. As a result, control of engine output appropriate for the request signal can be suitably performed while maintaining the engine operating point after decrease in engine output within the high-efficiency region F0.

In a state in which the compressor 11 is being driven by surplus power from the motor 32, when a determination is made that the engine operating point becomes closer to the high-efficiency region F0 as a result of the amount of increase in engine output being reduced, and the air-conditioning request is fulfilled, the engine output is decreased. As a result, the air-conditioning state can be maintained while maintaining the engine operating point within the high-efficiency region F0.

Second Embodiment

Figure 4:
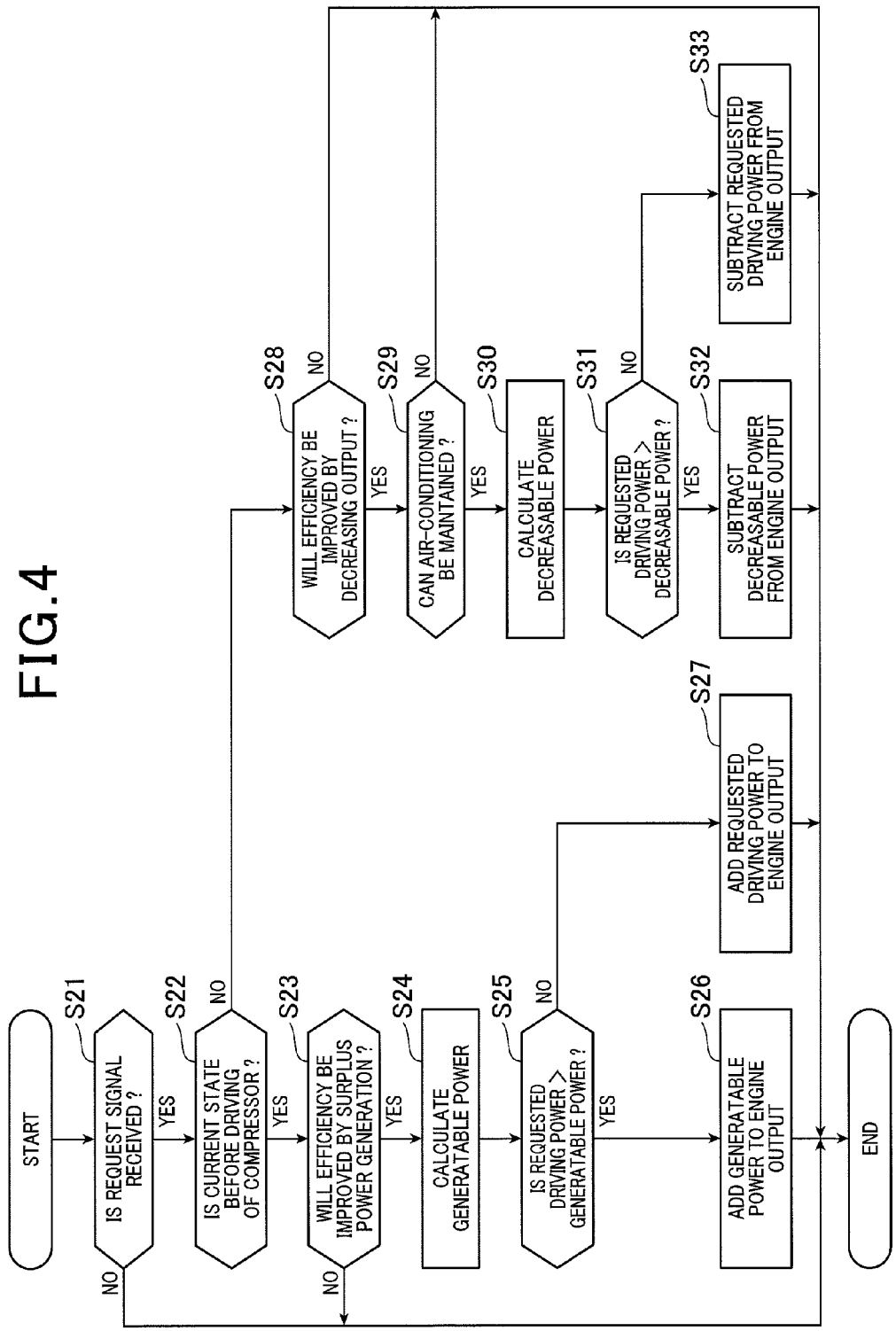
FIG. 4 is a flowchart of a process performed by an engine electronic control unit (ECU)

In the description above, in the pre-driving process at steps S23 to S27 in FIG. 4, the smaller of the requested driving output PD for the compressor 11 and the increasable output is added to the current engine output. Surplus power generation by the motor 32 is thereby controlled such that the post-addition engine output does not leave the high-efficiency region. However, when the increasable output is greater than the requested driving output PD, the amount added to the engine output is limited by the requested driving output PD. Therefore, the improvement in engine efficiency may be limited in a state in which the engine operating point can be brought even closer to the maximum efficiency point.

Figure 6A:
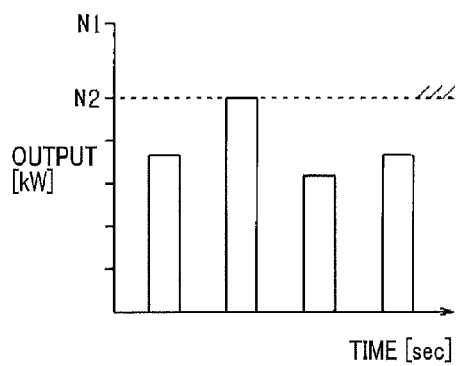
FIGS. 6A and 6B are diagrams of an operation example of the air-conditioning system.
Figure 6B:
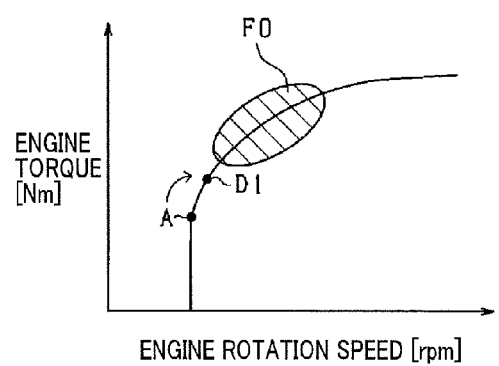

For example, when the engine operating point is at point A that is further towards the low NE side than the high-efficiency region F0, as shown in FIG. 6B, the increasable output by which engine output can be increased without the engine operating point exceeding the high-efficiency region F0 is N1 (kW) and the requested driving output PD for the compressor 11 is N2 (kW) that is less than the increasable output N1, as shown in FIG. 6A. In this case, when the amount of increase corresponding to the increasable output N1 is added to the current engine output, the engine operating point can be improved so as to be in the high-efficiency region F0. However, when the amount of increase corresponding to the requested driving output PD is added to the current engine output, rising of the engine operating point is limited to an efficiency point D1 that is below the high-efficiency region F0.

When the surplus power outputted as a result of the surplus power generation by the motor 32 by the engine 31 being driven can be supplied to another apparatus (load), the engine operating point can be further improved by taking advantage of the supply of surplus power to the other apparatus. According to the present embodiment, surplus power can be supplied to the battery 40 as charging power. Taking advantage of this feature, the amount of increase corresponding to chargeable power PD1, which is power with which the battery 40 can be charged, can be further added to the engine output. Engine efficiency can be further improved. The chargeable power PD1 is calculated by the motor ECU 22 based on battery characteristics, such as the charging state (SOC) of the battery 40 and the battery temperature.

Figure 7A:
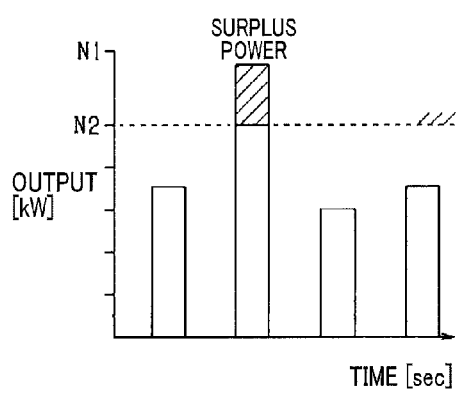
FIGS. 7A and 7B are diagrams of an operation example of an air-conditioning system according to a second embodiment.
Figure 7B:
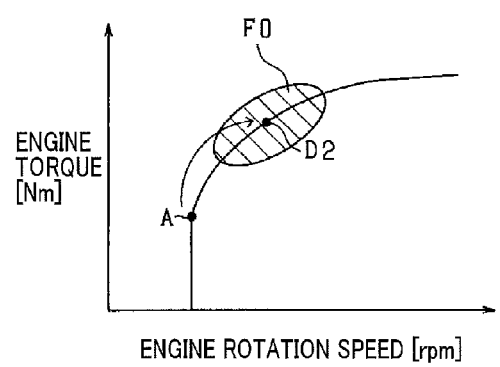

For example, when the engine operating point is further towards the low NE side than the high frequency region F0, as shown in FIG. 7B, the chargeable power PD1 of the battery 40 is added to the requested driving output PD required for driving the compressor 11, as shown in FIG. 7A. In this case, compared to the instance in FIG. 6B, in FIG. 7B, the engine operating point can be elevated to an efficiency point D2 (such as the maximum efficiency point) within the high-efficiency region.

It is assumed that the total value (referred to, hereafter, as a total requested driving output) of the chargeable power PD1 and the requested driving output PD may be greater than the increasable output N1. In this case, the amount of increase corresponding to the increasable output N1 is added to the engine output. In this case, engine efficiency can be improved while suppressing a state in which the engine operating point exceeds the high-efficiency region F0.

In addition, when surplus power can be supplied to a plurality of apparatuses including the compressor 11, the supply destination of the surplus power is preferably determined based on priority level for the supply of surplus power. For example, according to the present embodiment, when surplus power can be supplied to both the compressor 11 and the battery 40, the surplus power is preferentially supplied to the compressor 11 which has high power conversion efficiency. When surplus power is greater than the requested driving output, and the amount of surplus power supplied to the compressor 11 becomes excessive, the remaining surplus power is supplied to the battery 40 as charging power. In this way, when the supply destination of surplus power is determined based on priority level for power supply, engine efficiency can be improved while protecting air-conditioning performance and the battery 40.

Next, a pre-driving process according to the second embodiment performed by the engine ECU 21 will be described with reference to FIG. 8. The present process is performed when the engine ECU 21 determines YES at steps S21 and S22 in the process in FIG. 4, described above. In addition, in the description hereafter, detailed descriptions of processes that are the same as the processes in FIG. 4 are omitted.

As the pre-drive process, first, the engine ECU 21 determines whether or not engine efficiency can be improve as a result of surplus power generation being performed by the motor 32 by the engine 13 being driven (step S41). When determined that engine efficiency cannot be improved, the engine ECU 21 ends the process. When determined that engine efficiency can be improved, the engine ECU 21 calculates the increasable output (step S42). Next, the engine ECU 21 determines whether or not the total requested driving output is greater than the increasable output (step S43).

When determined that the total requested driving output is greater than the increasable output, the engine ECU 21 adds the amount of increase corresponding to the increasable output to the current engine output (step S44). Then, the engine ECU 21 supplies the surplus power generated by the surplus power generation at step S44 to the compressor 11 (step S45). Next, the engine ECU 21 determines whether or not the surplus power is greater than a requested driving power PI (step S46). When determined YES at step S46, the engine ECU 21 supplies the surplus from the power supply to the compressor 11 (surplus power-requested driving power PI) to the battery 40 (step S47). When determined NO at step S46, the engine ECU 21 ends the process.

When determined that the total requested driving output is less than the increasable output at step S43, the engine ECU 21 adds the amount of increase corresponding to the total requested driving output to the current engine output (step S48). The engine ECU 21 then performs the processes at steps S45 to S47.

As a result of the foregoing, the following excellent effects are achieved.

The sum of the requested driving output for the compressor 11 and the requested charging power for the battery 40 is the total requested driving output. When the total requested driving output is greater than the increasable output, the amount of increase corresponding to the increasable output is added to the current engine output. Therefore, the engine operating point can be elevated towards the high-efficiency region F0 side as a result of increase in engine output based on the increasable output, while suppressing a state in which the engine operating point after the increase in engine output exceeds the high-efficiency region F0.

The sum of the requested driving output for the compressor 11 and the requested charging power for the battery 40 is the total requested driving output. When the total requested driving output is less than the increasable output, the amount of increase corresponding to the total requested driving output is added to the current engine output. Therefore, the engine operating point can be further elevated towards the high-efficiency region F0 side compared to when the engine output is increased only by the requested driving output for the compressor 11, while suppressing a state in which the engine operating point after the increase in engine output exceeds the high-efficiency region F0.

When the surplus power generated by surplus power generation can be supplied to both the compressor 11 and the battery 40, the surplus power is supplied to the compressor 11 or the battery 40 that has a higher priority level for power supply. Therefore, engine efficiency can be improved while protecting air-conditioning performance of the air-conditioning system 10 and protecting the battery 40.

When the amount of surplus power supplied to a load (the compressor 11 or the battery 40) having a high priority level for power supply exceeds an allowable amount, the remaining surplus power is supplied to another load. Therefore, engine efficiency can be improved while making use of surplus power.

When surplus power can be supplied to both the compressor 11 and the battery 40, the surplus power is preferentially supplied to the compressor 11 which has a high power conversion efficiency. Therefore, engine efficiency can be improved while improving system efficiency.

Third Embodiment

When the compressor 11 cannot be driven by surplus power, such as when disconnection or another malfunction occurs in the compressor 11, a problem caused by excessive surplus power generation may occur when the total requested driving output, set based on the requested driving output PD for the compressor 11 and the chargeable power PD1 of the battery 40, is set as the upper limit value of the amount of increase in engine output by surplus power generation. Therefore, when an abnormal state in which the compressor 11 cannot be driven by surplus power occurs, the upper limit value of the amount of increase in engine output may be set to the chargeable power PD1 of the battery 40.

Figure 9:
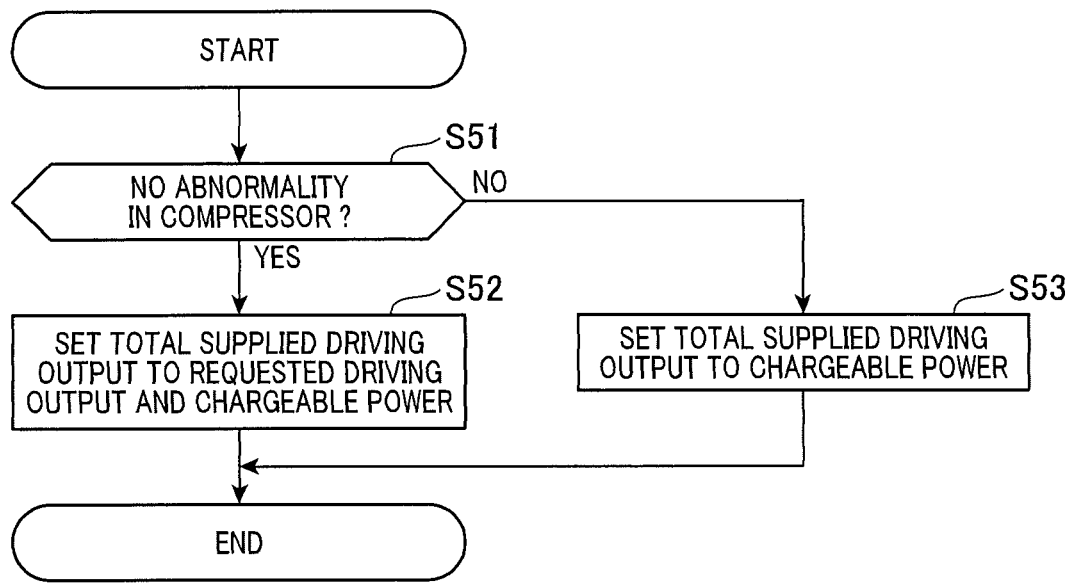
FIG. 9 is a flowchart of an abnormality determination process according to a third embodiment.

For example, in the flowchart of a modified example in FIG. 9, the engine ECU 21 determines whether or not there is no abnormality in the compressor 11 (step S51). In the present process, the engine ECU 21 can make the determination based on detected values for voltage and current of the compressor 11, and the like.

When determined that there is no abnormality at step S51, the engine ECU 21 sets the upper limit value of the amount of increase in engine output to the total requested driving output, which is the total value of the requested driving output PD for the compressor 11 and the chargeable power PD1 of the battery 40 (step S52). When determined that there is an abnormality at step S51, the engine ECU 21 sets the upper limit value of the amount of increase in engine output to the chargeable power PD1 of the battery 40 (step S53). As a result, even when surplus power cannot be supplied to the compressor 11, engine efficiency can be improved through use of the chargeable power of the battery 40.

Other Embodiments

The present invention is not limited to the descriptions above. The present invention may also be carried out as described below. Configurations in the descriptions below that are the same as the configurations described above are given the same reference numbers. Detailed descriptions thereof are omitted. In addition, the embodiments described above can be combined with the other embodiments described below.

According to the above-described first embodiment, when the motor 32 performs surplus power generation, the requested driving output PD for the compressor 11 is the amount of power enabling the compressor 11 to be driven at the highest efficiency. However, this may be changed. For example, the requested driving output PD for the compressor 11 may be variably set based on the difference between the engine operating point before the start of driving of the compressor 11 and the high-efficiency region F0. In this case, the requested driving output PD increases as the difference between the engine operating point and the high-efficiency region F0 increases.

According to the above-described first embodiment, a following configuration is possible. When the request signal to drive the compressor 11 is outputted at step S21 in FIG. 4, whether or not the engine 31 is in a state of operation may be determined. When the engine 31 is stopped, driving of the compressor 11 by surplus power generation may not be performed.

Figure 3:
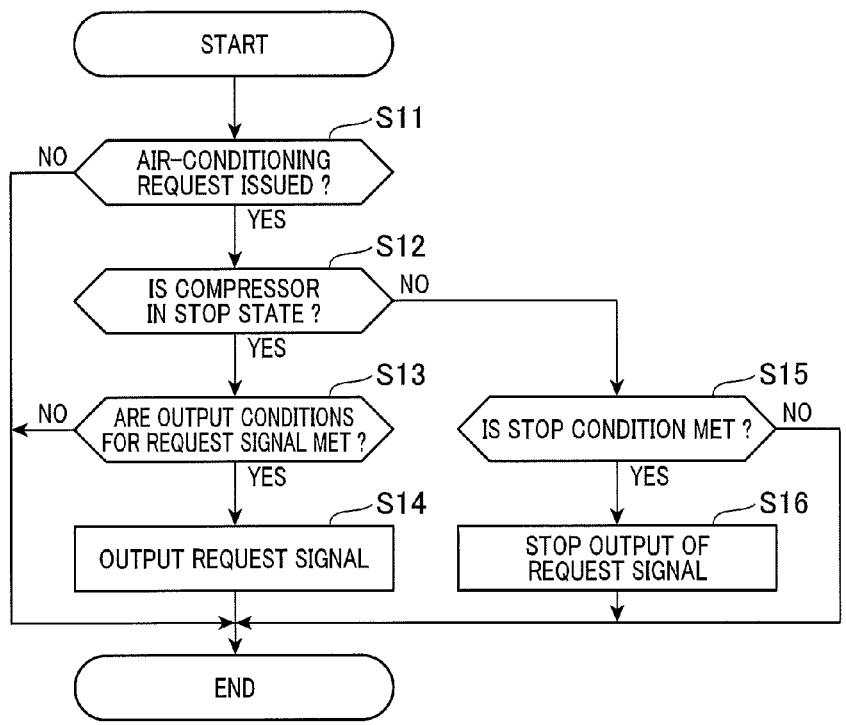
FIG. 3 is a flowchart of a process performed by an air-conditioning electronic control unit (ECU)

According to the above-described first embodiment, surplus power generation may be performed in the process in FIG. 4 such that, when the request signal from the air-conditioning ECU 23 is issued in the process in FIG. 3, the operating point of the engine 31 is in the high-efficiency region F0 regardless of the driving amount of the compressor 11 based on the request signal. In this case, surplus power may be used to charge the battery 40.

According to the above-described first embodiment, the amount of power enabling the compressor 11 to be driven at the highest efficiency is prescribed as the requested driving output PD, taking into consideration the efficiency of the compressor 11. However, the requested driving output PD may also be prescribed as being a value that enables the compressor 11 to be driven in a predetermined state of high efficiency. In addition, the requested driving output PD may be variably set depending on the heat storage state of the cold storage material 18a.

According to the above-described second embodiment, an example is given in which, when surplus power can be supplied to both the compressor 11 and the battery 40, the surplus power is preferentially supplied to the compressor 11. However, in the process in FIG. 8, the apparatus (load) to be preferentially supplied the surplus power can be determined, based on the priority levels for power supply of the compressor 11 and the battery 40.

For example, the priority levels for power supply of the compressor 11 and the battery 40 can be determined based on vehicle cabin temperature and battery characteristics. Specifically, when the vehicle cabin temperature is high, the surplus power is preferentially supplied to the compressor 11 to prioritize to the cooling function. Meanwhile, when the SOC of the battery 40 is low, the surplus power is preferentially supplied to the battery 40 to protect the battery 40. When the vehicle cabin temperature is high and the SOC of the battery 40 is low, the surplus power is preferentially supplied to the battery 40 to protect the battery 40. In addition, when the temperature of the battery 40 is high, the surplus power is preferentially supplied to the compressor 11 to protect the battery 40.

According to the above-described second embodiment, an example is given in which, in the process in FIG. 8, surplus power is supplied to an apparatus having a high priority level for power supply. The remaining surplus power is supplied to another apparatus. In addition, a distribution ratio for surplus power to each apparatus may be set based on the priority levels. For example, the ratio of surplus power supplied to the compressor 11 and the battery 40 is set based on the priority levels. Specifically, the ratio of surplus power supplied to the compressor 11 is increased by setting the compressor 11 to a higher priority level as the vehicle cabin temperature increases. The ratio of power supply supplied to the battery 40 is increased by setting the battery 40 to a higher priority level as the SOC of the battery 40 decreases.

According to the above-described second embodiment, when surplus power can be supplied to both the compressor 11 and the battery 40, the surplus power may be supplied to the compressor 11 which has a high power conversion efficiency, without taking into consideration the priority level.

According to the above-described second embodiment, the total requested driving output may be set to the total value of the requested driving output PD for the compressor 11, the chargeable power PD1 of the battery 40, and charge loss of the battery 40. In this case, the surplus power that is outputted using surplus power generation can be further increased, and engine efficiency can be more easily improved.

According to the above-described second embodiment, the total requested driving output may be set taking into consideration the amount of cold storage in the evaporator 18. In this case, engine output for surplus power generation can be further increased.

According to the above-described second embodiment, an example is given in which the surplus power is supplied to the compressor 11 and the battery 40. However, when another apparatus (load) that can be supplied surplus power is mounted in the vehicle 30, the upper limit of the amount of increase in engine output may be set taking into consideration the amount of surplus power supplied to this apparatus.

In the descriptions above, when the charging request for charging of the battery 40 is outputted as a result of the SOC of the battery 40 decreasing below a predetermined level, when the operating point of the engine 31 enters the high-efficiency region F0 as a result of the amount for driving the compressor 11 being added, the motor 32 may perform power generation with the addition of the amount for driving the compressor 11. When cold storage for the compressor 11 is performed using the charging opportunity of the battery 40, the number of times the engine 31 is driven based on requests from the air-conditioning system 10 can be reduced.

In the descriptions above, the configuration of the cold storage material 18a may be omitted. In this case as well, output control of the engine 31 such that the engine operating point is in the high-efficiency region F0 and the process for stopping output control during the cold release period can be alternately performed. As a result, suitable engine control can be actualized without excessively introducing surplus power for air-conditioning.

Figure 10A:
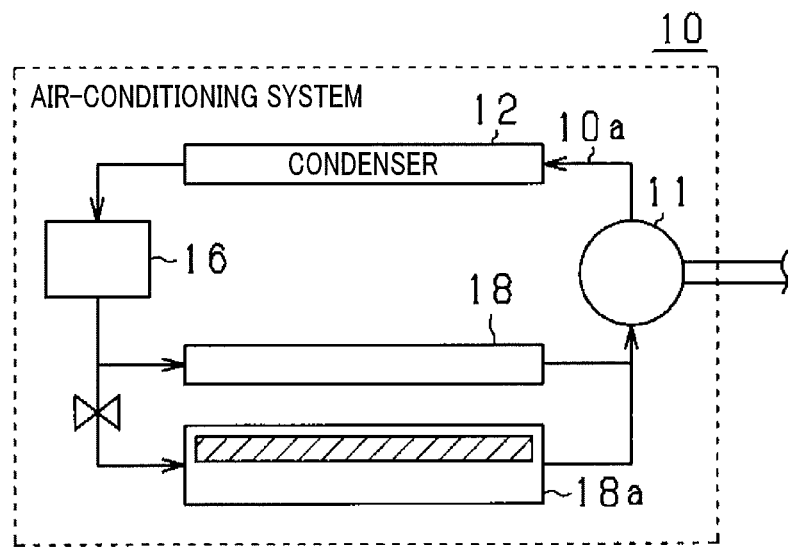
FIGS. 10A and 10B are diagrams of an air-conditioning system in a modified example.
Figure 10B:
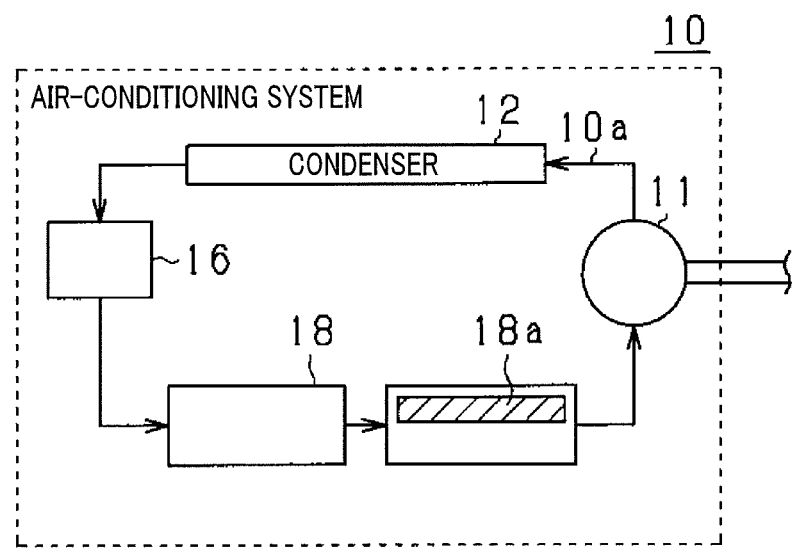

In the descriptions above, the cold storage material 18a and the evaporator 18 may be configured such as to be separate units as in the modified example of the air-conditioning system in FIG. 10. For example, as shown in FIG. 10A, the evaporator 18 and the cold storage material 18a may be provided in parallel. In addition, as shown in FIG. 10B, the evaporator 18 and the cold storage material 18b may be provided in series.

Figure 11:
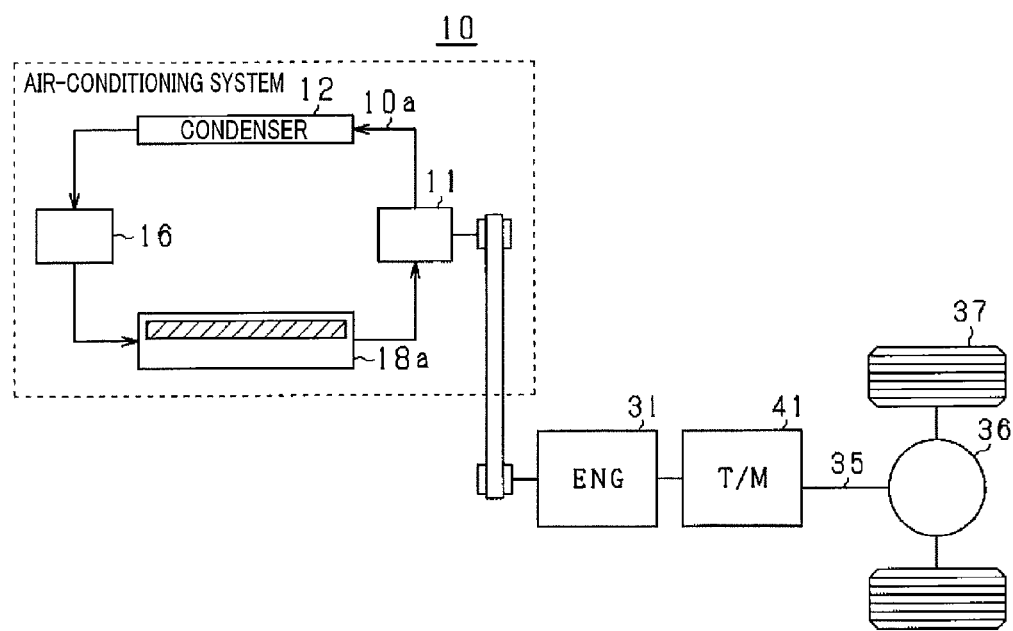
FIG. 11 is a diagram of an air-conditioning system in a modified example.

In the descriptions above, an example of the air-conditioning system 10 that uses an electric compressor is given. However, the compressor 11 of the air-conditioning system 10 may be a mechanical type, as shown in the modified example of the air-conditioning system in FIG. 11. In this case, the compressor 11 and the engine 31 are connected by a connecting member (no reference number given), such as a belt. Driving force from the engine 31 is transmitted to the compressor 11 via the belt. In FIG. 11, a transmission 41 is connected between the engine 31 and the differential gear 36.

In the processes in FIG. 4 and FIG. 8, described above, engine output may be controlled such that the engine operating point becomes closer to the maximum efficiency point within the high-efficiency region F0. In other words, the engine ECU 21 may determine YES in the processes at step S23 in FIG. 4 and step S41 in FIG. 8, when the engine operating point becomes closer to the maximum efficiency point.

The correspondence between the terms used in the above-described embodiments and the terms used in the claims is as follows. The engine ECU 21, which includes a microcomputer (including a CPU, a ROM and a RAM), corresponds to an example of a control apparatus that functions as an allowed/not-allowed determiner means (or an allowed/not-allowed determiner) and a controller means (or a controller). The cold storage material 18a corresponds to an example of a cold storage means. The motors 32 and 33 corresponds to an example of a power generator means. The control apparatus may further function as an increasable output calculator means (or an increasable output calculator) and a determiner means (or a determiner). In this case, the control apparatus may also function as an output controller means (or an output controller). The control apparatus may further function as a compressor drive determiner means (or a compressor drive determiner). In this case, the control apparatus may also function as a decreasable output calculator means (or decreasable output calculator) and a determiner means (or a determiner). The control apparatus may further function as a request determiner means (or a request determiner).

What is claimed is:

1. A control apparatus that is applied to a system including an engine and a compressor for air-conditioning, and adjusts an operating point of the engine when the engine is operated, the control apparatus comprising:
    a processor configured to:
        determine whether or not to allow increase in engine output to drive a compressor based on an air-conditioning request and based on the operating point of the engine before driving of the compressor in relation to a predetermined high-efficiency region including a maximum efficiency point in efficiency characteristics of the engine, when the compressor is driven in response to the air-conditioning request; and
        control the engine output such that the operating point of the engine is in the high-efficiency region, when the increase in engine output is determined to be allowed.
2. The control apparatus according to claim 1, wherein:
    the processor is further configured to:
    determine to allow the increase in engine output when the operating point of the engine before driving of the compressor becomes closer to the high-efficiency region by surplus output of the engine when the compressor is driven in response to the air conditioning request; and
    increase the engine output such that the operating point of the engine becomes in the high-efficiency region, when the increase in engine output is determined to be allowed for the surplus output.
3. The control apparatus according to claim 2, wherein:
    the processor is further configured to:
    calculate an increasable output by which the engine output can be increased without exceeding the high-efficiency region in in the efficiency characteristics of the engine, based on the operating point of the engine before driving of the compressor;
    determine whether or not a requested driving output for the compressor upon driving of the compressor is greater than the increasable output calculated by the processor; and
    add, to a current engine output, an amount of increase corresponding to the increasable output, when the increase in engine output is determined to be allowed for the surplus output and when the requested driving output for the compressor is greater than the increasable output.
4. The control apparatus according to claim 3, wherein the processor is further configured to add, to a current engine output, an amount of increase corresponding to the requested driving output for the compressor, when the increase in engine output is determined to be allowed for the surplus output and when the requested driving output for the compressor is less than the increasable output.
5. The control apparatus according to claim 3, wherein the requested driving output for the compressor is a power for enabling the compressor to be driven in a predetermined high efficiency state.
6. The control apparatus according to claim 2, wherein:
    the control apparatus is applied to a system including a battery capable of being charged by the engine; and
    the processor is further configured to:
        calculate an increasable output capable of increasing the engine output without exceeding the high-efficiency region in the efficiency characteristics of the engine, based on the operating point of the engine before driving of the compressor; and
        determine whether or not a total requested driving output is greater than the calculated increasable output, the total requested driving output being a sum of a requested driving output for the compressor upon driving of the compressor and a requested charging power for the battery upon charging of the battery; and
    add, to a current engine output, an amount of increase corresponding to the increasable output, when the increase in engine output is determined to be allowed for the surplus output and when the total requested driving output is greater than the increasable output.
7. The control apparatus according to claim 6, wherein:
    the processor is further configured to add, to a current engine output, an amount of increase corresponding to the total requested driving output, when the increase in engine output is determined to be allowed for the surplus output and when the total requested driving output is less than the increasable output.
8. The control apparatus according to claim 6, wherein:
    the processor is further configured to:
    perform control to supply surplus power generated by the surplus output; and
    when the surplus power can be supplied to both the compressor and the battery as loads to which the surplus power is supplied, supply the surplus power to one of the loads that has a higher priority level for power supply.
9. The control apparatus according to claim 8, wherein when an amount of the surplus power supplied to one of the loads having a high priority level for power supply exceeds an allowable amount, the processor is further configured to supply a remaining surplus power to the other of the loads.

10. The control apparatus according to claim 8, wherein:
the processor is further configured to determine a high priority level for power supply of the surplus power generated by the surplus output, based on a vehicle cabin temperature and a battery characteristics of the battery.

11. The control apparatus according to claim 8, wherein:
the processor is further configured to determine whether or not the requested charging power for the battery is greater than the increasable output when there is an abnormality in the compressor.

12. The control apparatus according to claim 6, wherein:
the processor is further configured to:
perform control to supply surplus power generated by the surplus output; and
supply the surplus power to the compressor when the surplus power can be supplied to both the compressor and the battery.

13. The control apparatus according to claim 1, wherein:
the processor is further configured to alternatively perform an increase in engine output and a pause of the increase during which the air-conditioning request is generated.

14. The control apparatus according to claim 1, wherein:
the compressor is provided in an air-conditioning system including a cold storage material that stores heat from a refrigerant circulated by driving of the compressor; and
the processor is further configured to perform control of the engine output such that the operating point of the engine is in the high-efficiency region within a cold storage period during which cold storage is performed by the cold storage material, and to stop the control of the engine output within a cold release period following the cold storage period.

15. The control apparatus according to claim 1, wherein the processor is further configured to:
determine whether or not the operating point of the engine becomes closer to the high-efficiency region by decreasing an amount of increase in engine output for driving the compressor, when control of the engine output is performed by the processor and the compressor is driven, and
decrease the engine output when determined that the operating point of the engine becomes closer to the high-efficiency region by decreasing the amount of increase in the engine output.

16. The control apparatus according to claim 15, wherein:
the processor is further configured to:
calculate a decreasable output capable of decreasing the engine output without exceeding the high-efficiency region in the efficiency characteristics of the engine, based on the operating point of the engine in a state where the compressor is driven;
determine whether or not a requested driving output for the compressor upon driving of the compressor is greater than the decreasable output calculated by the processor, and
subtract, from a current engine output, an amount of decrease corresponding to the decreasable output, when the requested driving output for the compressor is greater than the decreasable output in a state where the compressor is driven.

17. The control apparatus according to claim 16, wherein:
the processor is further configured to subtract, from a current engine output, an amount of decrease corresponding to the requested driving output for the compressor, when the requested driving output for the compressor is less than the decreasable output in a state where the compressor is driven.

18. The control apparatus according to claim 15, wherein:
the processor is further configured to:
determine whether or not a current air-conditioning request is met even when an amount of increase in the engine output for driving the compressor is decreased, when control of the engine output is performed by the processor and the compressor is driven; and
decrease the engine output when determined that a current air-conditioning request is met even when an amount of increase in the engine output for driving the compressor is decreased.

19. The control apparatus according to claim 1, wherein:
the control apparatus is applied to a system including a power generator that generates heat by driving the engine;
the processor is further configured to determine to allow the increase in engine output when the operating point of the engine before driving of the compressor becomes closer to the high-efficiency region by surplus output of the engine for surplus power generation of the power generator when the compressor is driven in response to the air conditioning request.

20. A system comprising:
an engine;
a compressor for air-conditioning; and
a control apparatus that adjusts an operating point of the engine when the engine is operated,
the control apparatus comprising:
a processor configured to:
determine whether or not to allow increase in engine output to drive a compressor based on an air-conditioning request and based on the operating point of the engine before driving of the compressor in relation to a predetermined high-efficiency region including a maximum efficiency point in an efficiency characteristics of the engine, when the compressor is driven in response to the air-conditioning request; and
control the engine output such that the operating point of the engine is in the high-efficiency region, when the increase in engine output is determined to be allowed.

* * * * *